July 14, 1942.     A. J. ROOT     2,289,553
OIL FILTER
Filed Aug. 18, 1939
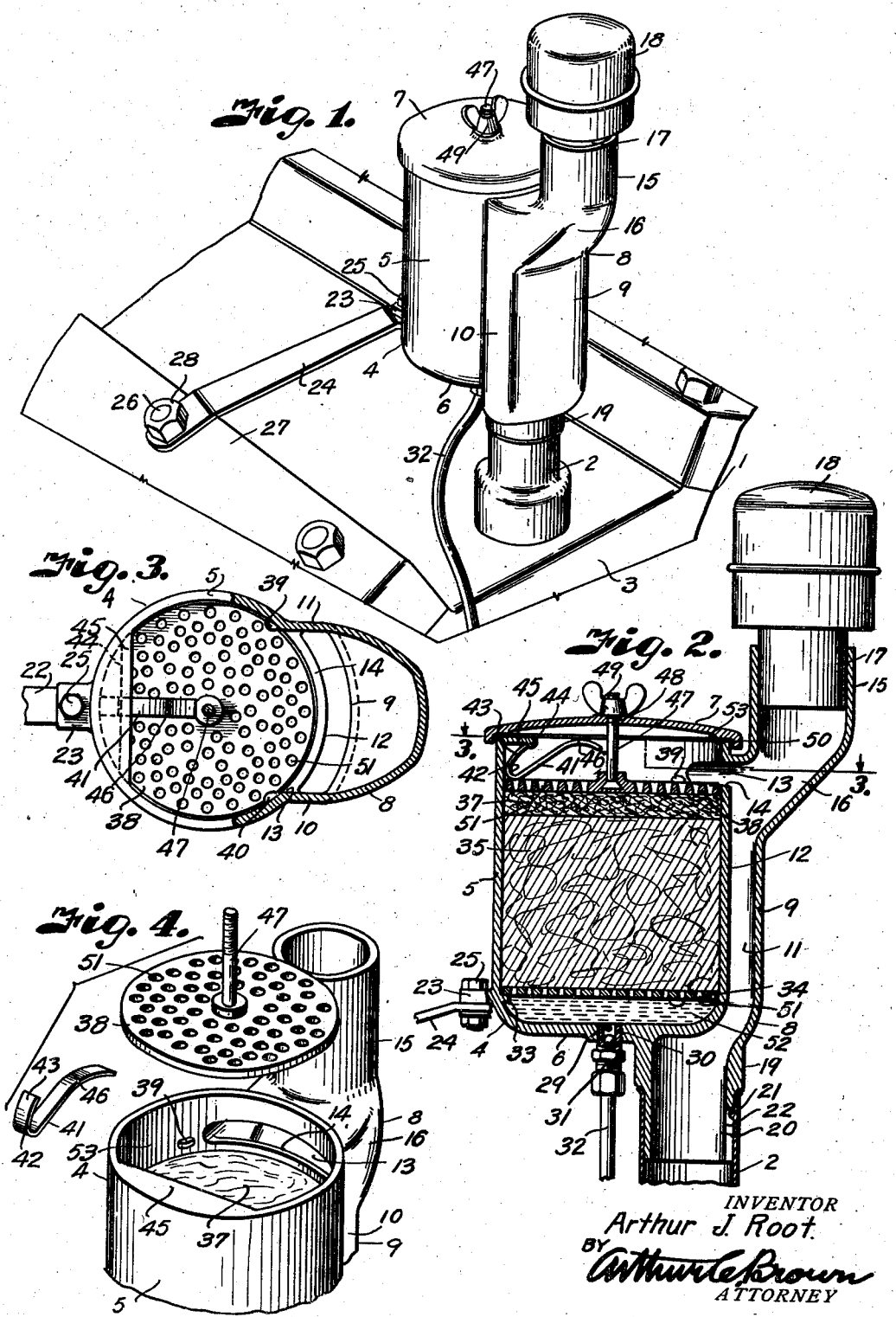
INVENTOR
Arthur J. Root.
BY
Arthur E. Brown
ATTORNEY Patented July 14, 1942

2,289,553

UNITED STATES PATENT OFFICE 2,289,553

OIL FILTER

Arthur J. Root, Quapaw, Okla.

Application August 18, 1939, Serial No. 290,805

4 Claims. (Cl. 210—131)

This invention relates to filters, particularly those for connection with the oil circulatory system of an internal combustion engine, and has for its principal object to provide a filter construction adapted for association with the ventilating system of a crank-case, whereby air drawn into the crank-case for ventilation purposes is utilized to effect removal of the liquid diluents and aeration of the oil passed through the filter.

Other objects of the invention are to provide a filter construction substantially balanced with respect to its mounting so that it may be supported and directly attached to the breather tube of the crank-case; to provide a filter construction wherein the oil, after passing through the filter, is converted in a thin, sheet-like stream for flow in contact with the air passing into the crank-case; to provide a filter in which the oil can be inspected, while the filter is functioning, by removing the cover; to provide a filter in which the oil is returned to the crank-case by gravity through large openings eliminating pressure on the return system; and to provide a filter construction wherein the filter elements are readily removed for replacement and inspection.

In accomplishing these and other objects of the invention, as hereinafter pointed out, I have provided improved details of structure, the preferred form of which is illustrated in the accompanying drawing, wherein:

Fig. 1 is a perspective view of a portion of a well known motor vehicle engine equipped with a filter embodying the features of the present invention.

Fig. 2 is a vertical section through the filter and the breather connection of the internal combustion engine.

Fig. 3 is a horizontal section on the line 3—3 of Fig. 2.

Fig. 4 is a detail perspective view of the upper portion of the filter showing the cover plate removed and the filtering material retaining plate and its locking spring shown in disassembled spaced relation with respect to the filter casing.

Referring more in detail to the drawing:

I designates a portion of a well known type internal combustion engine, having a breather connection 2 leading to the crank-case (not shown) by way of the cylinder block 3, and through which oil is supplied and replenished from time to time as in conventional practice.

In the engine of the type illustrated, oil is drawn from the crank-case and delivered under pump pressure to the various parts requiring lubrication and drains back into the crank-case for recirculation. Simultaneously ventilating air is drawn through the breather 2 and carried across the interior of the crank-case incidental to the inducing action effected at the scavenging outlet opening of the crank-case. The crank-case ventilation serves to remove the lighter vapors of any portions of unburned fuel passing the piston rings, but as the oil is continuously circulated it gradually becomes contaminated with fuel vapors, water vapor condensates, carbon deposits, and direct particles, which, unless the oil is changed frequently, results in rapid wear and deterioration of the engine. To overcome the necessity and expense of frequent oil changes filters have been provided, but they have not proved altogether satisfactory because of difficulty in installation and connection with the oil circulating system, particularly where the circulating system is of the enclosed type, and also because of failure in removing the light hydrocarbons vapors and moisture absorbed by the oil.

In carrying out the present invention, I therefore provide a filter construction which is readily connected with the circulatory system and adapted to be mounted directly upon the breather connection 2, which provides a convenient return of filtered oil to the engine without in any way altering the engine construction, and which eliminates pressure on the return oil, permitting inspection of the filtered oil while the engine is in operation.

I also provide a filter construction wherein the filtered oil is directly contacted with the air passing into the crank-case, so as to aerate the filtered oil and cause evaporation of liquid diluents passed through the filter, which vaporized diluents are carried along with the air, separately from the oil, and discharged through the crank-case outlet, as now to be described.

The filter includes a casing 4 having a cylindrical wall 5, a bottom 6, and a removable cover 7. Formed on the side of the casing and preferably integral therewith, as a passage or duct 8 including a portion 9 of substantially arcuate cross-section and having its inner arcuate side formed by the cylindrical wall 5. The sides 10 and 11 of the portion 9 are shown as substantially parallel and join with the wall 5 at substantially widely spaced points whereby the duct is relatively wide to form a substantially large surface 12 for gravitation of filtered oil from a slot-like opening 13 that extends transversely of the wall 5 between the upper ends of the sides 10 and 11, the lower edge of the opening forming a weir 14 to effect uniform spreading of the oil over the surface 12 as later described.

Formed as a part of the duct is an offset tubular collar 15, merging as at 16 into the body portion 9. The collar 15 has suitable diameter to receive the neck 17 of the usual breather cap 18 that is ordinarily inserted in the open end of the breather connection 2. The lower portion of the duct terminates in an inset cylindrical portion 19 depending partly from the bottom 6 and having a reduced neck 20 corresponding with the neck 17 so that it engages in the breather connection 2. The casing is retained from relative rotation with respect to the connection 2 by means of the lug 21, which engages a slot 22 of the neck 20 in the same manner as the cap 18 prior to installation of the filter.

The part 19, being inset toward the center of the filter casing, tends to balance the filter on the respective sides of the breather connection so that when the filter is in place it is stably supported by the filter connection. However, to positively retain the filter in position, the casing is provided with a laterally extending ear 23 which is attached to a brace arm 24 by a bolt 25. The opposite end of the brace arm has a suitable opening adapted to pass over one of the studs 26 securing one of the cylinder heads 27, the end of the arm being clamped between the head and the nut 28 on the stud, as clearly shown in Fig. 1.

The bottom of the casing has a centrally arranged threaded opening 29 for receiving the threaded neck 30 of a check valve fitting 31 to which an oil supply pipe 32 is connected. Spaced from the bottom of the casing and supported on inwardly extending lugs 33 is a perforated plate 34 supporting the filtering element 35. The filtering element 35 may be of any suitable type, for example a pack of cotton waste 36, superimposed by a felt disk 37. The disk 37 is retained in position by a plate 38 which has its upper surface substantially located in the plane of the weir 14 and is supported at one side by inwardly extending lugs 39 and 40 engaging the upper surface thereof and at the opposite side by a spring clamp 41.

The spring clamp 41 includes a rounded fulcrum portion 42 seated on the top of the plate 38 and having a finger 43 engaged under a rib 44 on a web 45 formed as a part of the casing. The clamp also includes a handle portion 46 by which the finger 43 may be rocked into engagement with the rib 44. The top plate 37 carries an upwardly extending threaded shank 47 extending through a central opening 48 in the cover 7, the shank 47 being of sufficient length to project through the cover for mounting a wing nut 49 by which the cover is clamped against a gasket 50 seated on a rim of the casing. The plates 34 and 38 may be formed of any suitable foraminated material but are here shown as consisting of sheet metal having a plurality of openings 51 distributed over the area thereof through which the oil is adapted to pass to and from the filter element. The lower plate, being supported from the bottom 6, provides an inlet chamber 52 for equal distribution of the dirty oil over the lower surface of the filtering material and the portion of the casing above the upper plate provides an outlet chamber 53 in direct communication with the opening 13.

In assembling the filter, the plate 34 is dropped through the open top of the casing so that the periphery thereof seats upon the lugs 33. The filtering material, which may be closely packed cotton waste or a conventional filtering cartridge, is inserted through the casing, followed by the felt disk 37 and the plate 38, the plate being so maneuvered that the edge thereof passes under the lugs 39 and 40, after which the spring clamp 41 is moved in position under the rib 44 and locked by pressing on the handle 46. The gasket 50 is then applied to the rim of the casing, followed by the cover 7. The wing nut 49 is then applied to the projecting end of the stud 47 to clamp the cover against the gasket.

In installing the filter on a motor, the breather cap 18 is removed from the breather connection 2. The neck 17 thereof is then placed within the collar 15 and the reduced portion 20 of the neck 19 is inserted in the open end of the breather connection 2. The brace arm 24 is then applied and secured to one of the cylinder head studs 26, as shown in Fig. 1. The supply pipe 32 is then connected with the pressure side of the oil system, for example with the line leading to the pressure gauge so that a portion of the oil flows under pump pressure through the pipe 32 into the chamber 52 through the openings 51 in the plate 34, and thence through the filtering material 35, felt disk 37 and openings 51 of the plate 38, into the chamber 53. The oil which has progressed through the filtering material is relieved of dust, dirt and other extraneous solid matter so that the oil flowing into the chamber 53 is free of foreign material except liquid diluents such as the unburned fuel and moisture which collects in the crank-case. The chamber 53 is in communication with the atmosphere through the breather cap and therefore the filtered oil may be inspected at any time by removing the cover 7 without effecting the flow of oil through the filter. The filtered oil containing liquid diluents flows across the weir 14 in a thin film so that it is spread for even flow down the arcuate surface 12 in contact with the air drawn through the duct 8. Due to the shape of the portion 9, the air is caused to move in close contact with the thin oil film, and at sufficient velocity to thoroughly separate the oil and vaporize the liquid diluents which are carried with the air into the crank-case.

Since the fitting 2 is located in the heat zone of the engine as is the passage leading therefrom, the vapors are heated by contact with the hot surfaces of the engine and are kept sufficiently warm so that they are retained in vapor state to be discharged as vapor through the scavenging outlet of the crank-case. The oil stream returned through the breather connection is therefore not only filtered but freed of liquid diluents.

Continued operation of the engine ultimately results in substantially complete filtration of the entire oil supply in the crank-case and the oil is thereafter maintained in clean condition so that it is only necessary to add quantities of oil required in maintaining the desired oil level.

From the foregoing it is obvious that I have provided a simple filter construction that is readily applied to the breather connection of an engine in such a manner that the air drawn through the breather serves to effectively vaporize any volatile liquid diluents contained in the oil.

What I claim and desire to secure by Letters Patent is:

1. An oil filter including a casing having an oil inlet at the bottom thereof adapted for connection with the lubricating system of an engine and having a horizontally disposed elongated outlet in the side thereof, a filter element completely filling the cross-sectional area of the casing, means supporting the filter element in the casing between said inlet and outlet with the upper portion of said filter element terminating slightly below said horizontally disposed outlet so that oil collecting above the filter element flows through said outlet across the length thereof, and an air flow duct having connection with said elongated outlet for conducting air into contact with the oil flowing from said elongated outlet, said air flow duct being adapted for connection with the crank-case breather of the engine.

2. An oil filter for the lubricating system of engines having a breather connection to the crank-case thereof including, a casing having an outlet for purified oil, a filter element supported in the casing, means supplying oil from the lubricating system of the engine to the casing for flow through said filter element, a check valve in said oil supply means, an air duct connecting the outlet of the casing with the breather connection of the engine and having an oil film carrying portion, and a weir extending across said outlet of the casing for spreading oil passing from the filter element across said film carrying portion of the air duct.

3. In combination with an oil circulating system of an internal combustion engine having a crank-case through which an air stream is caused to pass for removing crank-case vapors, a filter including a casing having an oil inlet in the bottom and an elongated substantially horizontal oil outlet in a side thereof forming a weir, a filter element, means supporting the filter element in the casing between said inlet and outlet, means connecting said inlet with the oil circulating system, a substantially vertically arranged air duct for said air stream having its upper end open directly to atmosphere and having a portion formed as a part of said casing to provide a relatively wide oil film conducting portion extending across and downwardly from said weir, and means connecting the duct with the crank-case for returning oil to the circulating system of the engine.

4. In combination with an oil circulating system of an internal combustion engine having a crank-case through which an air stream is caused to pass for removing crank-case vapors, a filter including a casing having an oil inlet in the bottom and an elongated substantially horizontal oil outlet in a side thereof forming a weir, a filter element, means supporting the filter element in the casing between the inlet and said weir, means connecting the inlet with the oil circulating system, an air duct for said air stream and formed as a part of said casing and having an oil film carrying portion substantially conforming in width to the length of the weir and extending downwardly therefrom, and means connecting the lower end of the air duct with the crank-case of the engine, said portion of the air duct including said film carrying portion being closely related therewith to effect flow of the air stream in contact with said film.

ARTHUR J. ROOT.